US012809317B2

(12) United States Patent
Yamazaki

(10) Patent No.: US 12,809,317 B2
(45) Date of Patent: Nov. 24, 2026

(54) ELECTRONICALLY CONTROLLED MECHANICAL WATCH

(71) Applicant: SEIKO EPSON CORPORATION, Tokyo (JP)

(72) Inventor: Yutaka Yamazaki, Okaya (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 18/598,023

(22) Filed: Mar. 7, 2024

(65) Prior Publication Data

US 2024/0302800 A1 Sep. 12, 2024

(30) Foreign Application Priority Data

Mar. 8, 2023 (JP) ................................ 2023-035891

(51) Int. Cl.

*G04C 10/00* (2006.01)
*G04B 1/10* (2006.01)
*G04B 3/06* (2006.01)
*G04C 3/10* (2006.01)

(52) U.S. Cl.

CPC ............... *G04C 10/00* (2013.01); *G04B 1/10* (2013.01); *G04B 3/06* (2013.01); *G04C 3/10* (2013.01)

(58) Field of Classification Search

None
See application file for complete search history.

(56) References Cited

U.S. PATENT DOCUMENTS 6,367,966 B1 * 4/2002 Hara ........................ G04B 1/10 368/204
2004/0013047 A1 1/2004 Shimizu et al.
2012/0056480 A1 * 3/2012 Sakumoto .............. G04C 10/04 323/265
2019/0187623 A1 * 6/2019 Tombez ................. G04G 19/06
2019/0187625 A1 6/2019 Tombez
2020/0285199 A1 9/2020 Tombez

FOREIGN PATENT DOCUMENTS

EP 3502798 A1 6/2019
JP H11-014767 A 1/1999
JP 2000-214271 A 8/2000

(Continued)

*Primary Examiner* — Edwin A. Leon
*Assistant Examiner* — Michael James Walker
(74) *Attorney, Agent, or Firm* — Harness, Dickey & Pierce, P.L.C.

(57) ABSTRACT

An electrically controlled mechanical watch includes a mainspring, a speed regulator that controls a rotation cycle of a wheel train, a control unit that controls the speed regulator, a power generator, a first power accumulation device, a second power accumulation device that is coupled to the first power accumulation device in parallel via a switch, and a detection unit that detects a mechanical energy amount accumulated in the mainspring. In a case in which the switch is in an off state, when it is detected that the mechanical energy amount exceeds a first set value, the control unit controls the switch from the off state to an on state. In a case in which the switch is in the on state, when it is detected that the mechanical energy amount falls below a second set value, the control unit controls the switch from the on state to the off state.

9 Claims, 10 Drawing Sheets

(56) References Cited

FOREIGN PATENT DOCUMENTS

| | | | | |
|---|---|---|---|---|
| JP | 2003255057 | A | * | 9/2003 |
| JP | 2006-220664 | A | | 8/2006 |
| JP | 2014-149256 | A | | 8/2014 |
| JP | 2020-512558 | A | | 4/2020 |
| JP | 2022-125745 | A | | 8/2022 |
| JP | 2022-125746 | A | | 8/2022 |

* cited by examiner

ELECTRONICALLY CONTROLLED MECHANICAL WATCH

The present application is based on, and claims priority from JP Application Serial Number 2023-035891, filed Mar. 8, 2023, the disclosure of which is hereby incorporated by reference herein in its entirety.

BACKGROUND

1. Technical Field

The present disclosure relates to an electronically controlled mechanical watch.

2. Related Art

There has been known an electronically controlled mechanical watch that accumulates, in a power accumulation device, electrical energy generated by driving a power generator using mechanical energy when a mainspring is released, drives a rotation control device by the electrical energy supplied from the power accumulation device, and control a rotation cycle of a power generator to accurately drive hands moved by a wheel train and accurate indicate the time (see JP-A-2000-214271).

It is disclosed that, in the electronically controlled mechanical watch of JP-A-2000-214271, an additional power supply device including an additional power generator such as a solar electric power generation device and a second power accumulation device is provided and electrical energy is supplied from the additional power source device when a voltage of the power accumulation device is reduced so as to extend the duration.

In the electronically controlled mechanical watch of JP-A-2000-214271, the additional power source device including the additional power generator and the like is provided in addition to the power generator that generates power by the mechanical energy. Thus, there is a problem that a movement of the watch is increased in size.

SUMMARY

An electronically controlled mechanical watch according to the present disclosure includes a mainspring, a wheel train configured to transmit mechanical energy of the mainspring, a hand driven by the wheel train to display the time, a speed regulator configured to control a rotation cycle of the wheel train, a control unit configured to control the speed regulator, a power generator configured to convert the mechanical energy of the mainspring to electrical energy, a first power accumulation device configured to accumulate the electrical energy of the power generator and supply the electrical energy to the control unit, a second power accumulation device coupled to the first power accumulation device in parallel via a switch and configured to accumulate the electrical energy, and a detection unit configured to detect a mechanical energy amount accumulated in the mainspring, wherein, in a case in which the switch is in an off state, when the detection unit detects that the mechanical energy amount exceeds a first set value, the control unit controls the switch from the off state to an on state, and in a case in which the switch is in the on state, when the detection unit detects that the mechanical energy amount falls below a second set value, the control unit controls the switch from the on state to the off state.

An electronically controlled mechanical watch according to the present disclosure includes a mainspring, a wheel train configured to transmit mechanical energy of the mainspring, a hand driven by the wheel train to display the time, a speed regulator configured to control a rotation cycle of the wheel train, a control unit configured to control the speed regulator, a power generator configured to convert the mechanical energy of the mainspring to electrical energy, a first power accumulation device configured to accumulate the electrical energy of the power generator and supply the electrical energy to the control unit, a second power accumulation device coupled to the first power accumulation device in parallel and configured to accumulate the electrical energy, a switch arranged between the first power accumulation device and the second power accumulation device and configured to switch a coupling state between the first power accumulation device and the second power accumulation device, wherein, when a winding-up amount of the mainspring exceeds a predetermined value, the switch is switched from an off state to an on state, and couples the second power accumulation device to the first power accumulation device, and when the winding-up amount of the mainspring falls below the predetermined value, the switch is switched from the on state to the off state, and decouples the second power accumulation device from the first power accumulation device.

DESCRIPTION OF EMBODIMENTS

Hereinafter, an electronically controlled mechanical watch 1 according to an embodiment of the present disclosure is described with reference to the drawings.

Figure 1:
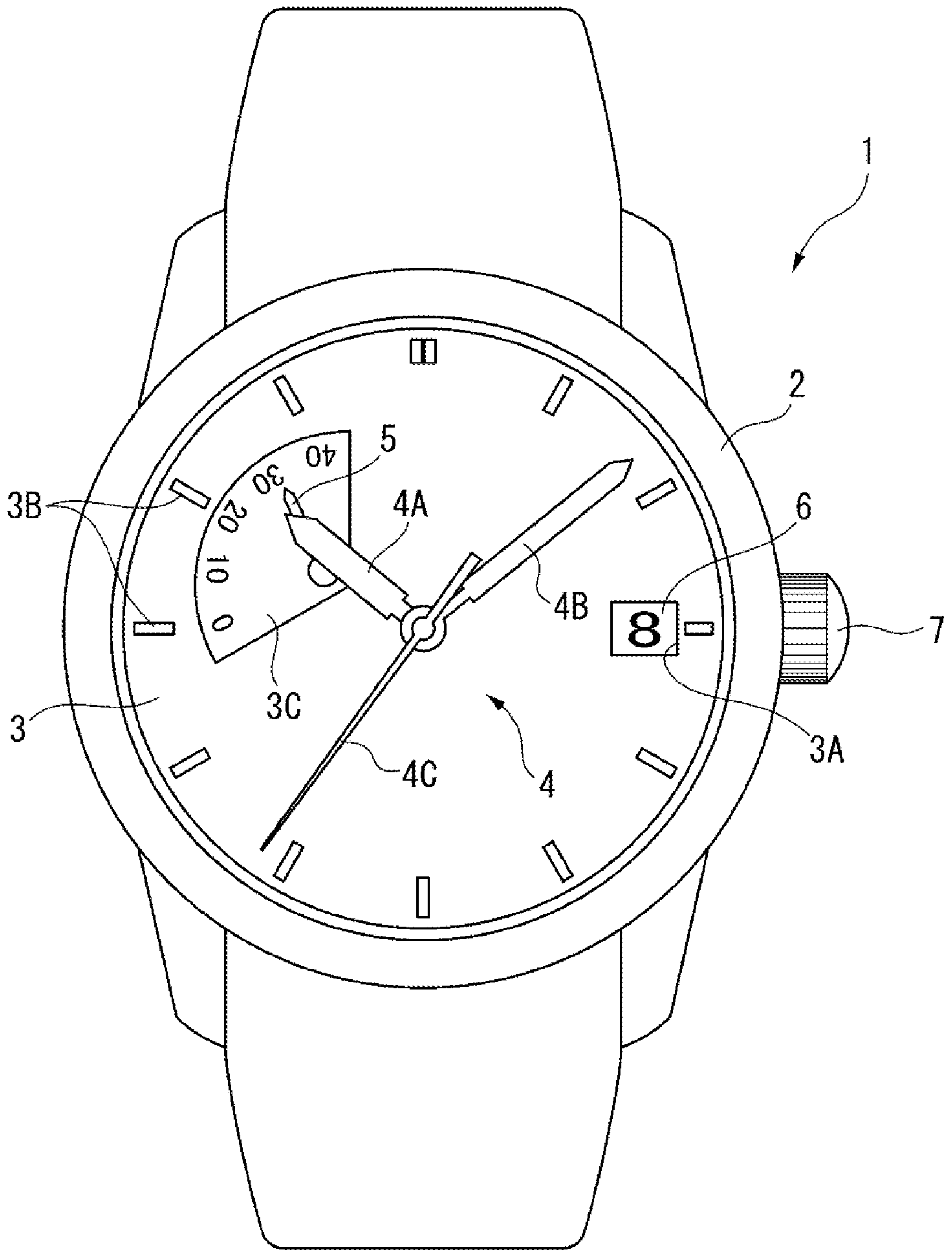
FIG. 1 is a front view illustrating an electronically controlled mechanical watch according to an embodiment.

FIG. 1 is a front view illustrating the electronically controlled mechanical watch 1. Note that, in the following description, the electronically controlled mechanical watch 1 is abbreviated as the watch 1. As illustrated in FIG. 1, the watch 1 is a wristwatch worn on a wrist of a user, and includes an outer case 2 having a cylindrical shape. A dial 3 is arranged on an inner circumferential side of the outer case 2. Of two openings of the outer case 2, the opening on the front surface side is sealed with a glass cover, and the opening on the back surface side is sealed with a case back.

The watch 1 includes a movement accommodated in the outer case 2 (not illustrated), and hands 4 that indicate time information. The hands 4 includes an hour hand 4A, a minute hand 4B, and a seconds hand 4C. A small calendar window 3A is provided in the dial 3, and a date indicator 6 can be visually recognized from the small calendar window 3A. Further, the dial 3 is provided with hour marks 3B that indicates the hour and a fan-like sub dial 3C that indicates the duration with a power reserve hand 5.

A crown 7 is provided on the side surface of the outer case 2. The crown 7 can be pulled out and moved from a zero-step position of being pushed in toward the center of the watch 1 to a first-step position and a second-step position.

When the crown 7 is pulled to the first-step position and rotated, the date indicator 6 can be moved to set the date. When the crown 7 is pulled to the second-step position, the seconds hand 4C stops. When the crown 7 is rotated at the second-step position, the hour hand 4A and the minute hand 4B can be moved to set the time. The method of correcting the date indicator 6, the hour hand 4A, and the minute hand 4B by using the crown 7 is the same as that of a watch in the related art, and hence description thereof is omitted.

Further, when the crown 7 is rotated at the zero-step position, a mainspring 40, which is described later, can be wound up. Further, the power reserve hand 5 moves in conjunction with winding-up of the mainspring 40. When the mainspring 40 is fully wound up, the watch 1 according to the present embodiment can secure the duration of approximately 72 hours.

Schematic Configuration of Watch

Figure 2:
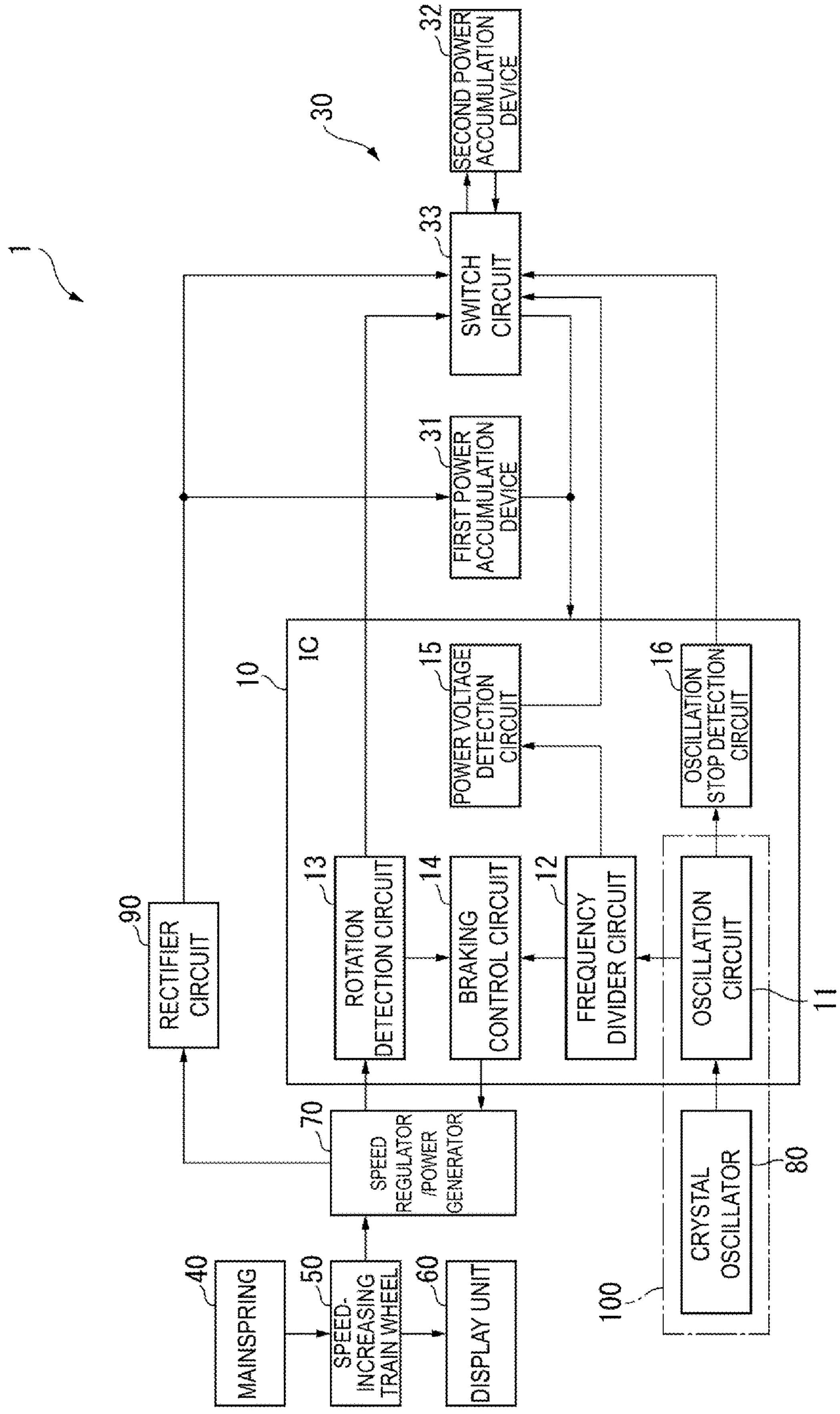
FIG. 2 is a block diagram illustrating a schematic configuration of the electronically controlled mechanical watch according to the embodiment.

FIG. 2 is a block diagram illustrating a schematic configuration of the watch 1.

As illustrated in FIG. 2, the watch 1 includes an IC 10 being a control unit, the mainspring 40 being a mechanical energy source, a speed-increasing wheel train 50 being an energy transmission device that transmits a torque of the mainspring 40, a display unit 60 that is coupled to the speed-increasing wheel train 50 to display the time, a power generator 70 that is driven by a torque transmitted via the speed-increasing wheel train 50, a crystal oscillator 80, a rectifier circuit 90, and a power supply circuit 30. As described later, the power generator 70 also functions as a speed regulator that regulates a rotation speed of the speed-increasing wheel train 50.

The IC 10 includes an oscillation circuit 11, a frequency divider circuit 12, a rotation detection circuit 13, a braking control circuit 14, a power voltage detection circuit 15, and an oscillation stop detection circuit 16. Details of each of the circuits are described later.

The mainspring 40 is wound up by the crown 7 via a winding-up wheel train (not illustrated).

The speed-increasing wheel train 50 is configured to include a plurality of toothed gears that are rotated by the mechanical energy accumulated in the mainspring 40, and moves the hour hand 4A, the minute hand 4B, and the seconds hand 4C that are attached to those toothed gears. Further, the speed-increasing wheel train 50 is meshed with a pinion of a rotor 71 of the power generator 70, and rotates the rotor 71.

Note that, although not illustrated, a power reserve wheel train that is in conjunction with the winding-up wheel train for winding up the mainspring 40 and the speed-increasing wheel train 50 is provided, and the power reserve hand 5 is attached to the power reserve wheel train.

The display unit 60 is configured to include the hands 4 and the date indicator 6 that are illustrated in FIG. 1, and displays the time.

Power Supply Circuit

The power supply circuit 30 includes a first power accumulation device 31, a second power accumulation device 32, and a switch circuit 33.

Figure 3:
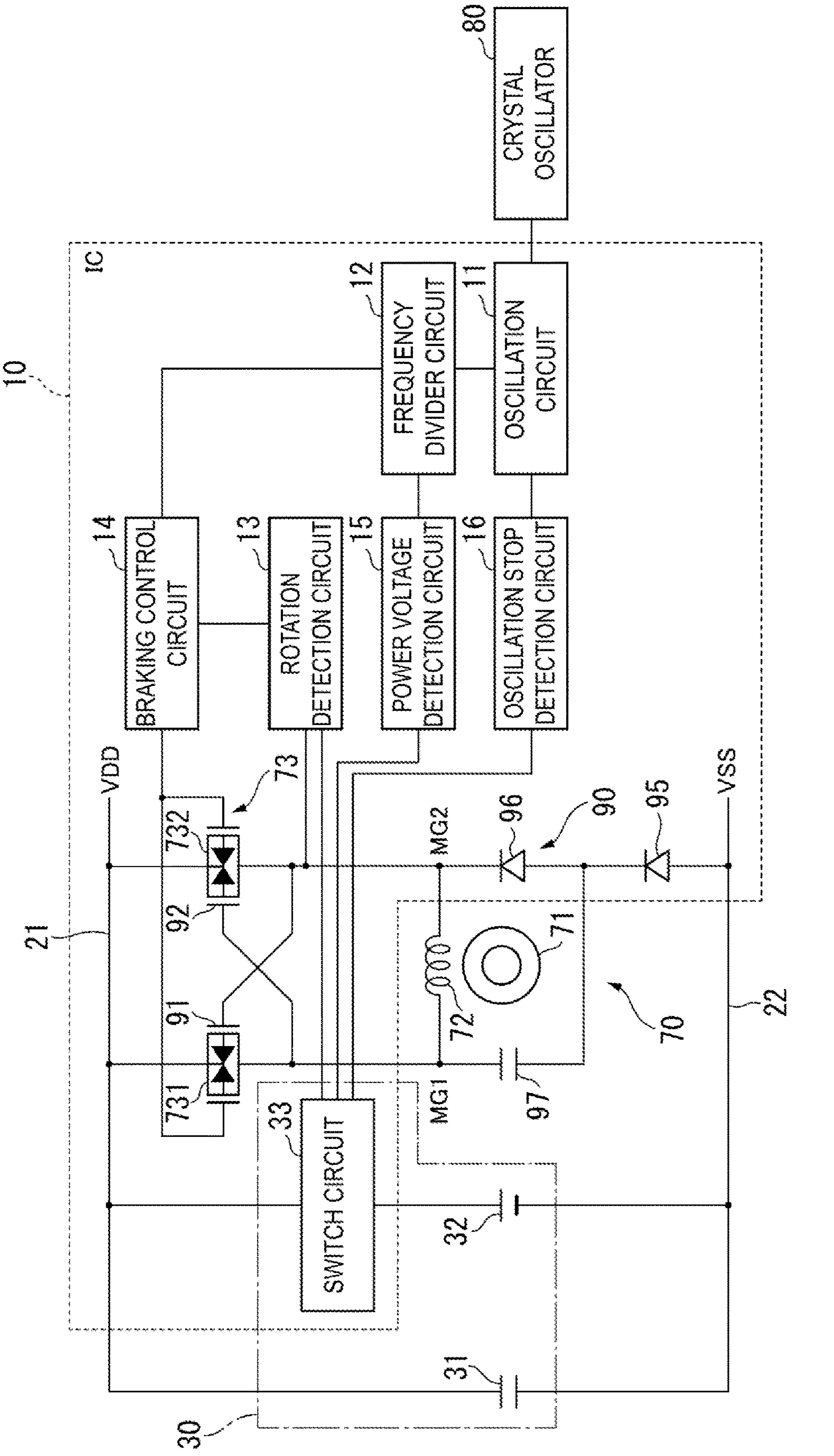
FIG. 3 is a circuit diagram illustrating a schematic configuration of main parts of the watch according to the embodiment.

As illustrated in FIG. 3, the first power accumulation device 31 is configured by a capacitor, accumulates the electric charges generated by the power generator 70, performs smoothing of the voltage, and supplies the resultant to the IC 10.

The second power accumulation device 32 is configured by a rechargeable secondary battery such as a lithium-ion battery and a solid-state buttery, and has a capacity larger than the first power accumulation device 31. Note that the second power accumulation device 32 is not limited to a secondary battery, and may be a large-capacity capacitor.

The first power accumulation device 31 is directly coupled to the rectifier circuit 90, and the second power accumulation device 32 is coupled to the rectifier circuit 90 via the switch circuit 33. Thus, when the switch circuit 33 is controlled to the on state, the second power accumulation device 32 is coupled in parallel to the first power accumulation device 31. In other words, when the switch circuit 33 is controlled to the on state, the first power accumulation device 31 and the second power accumulation device 32 are coupled in parallel to a first power line 21 conducted to a VDD terminal of the IC 10 and a second power line 22 conducted to a VSS terminal of the IC 10. Further, when the switch circuit 33 is controlled to the off state, the second power accumulation device 32 is decoupled from the first power line 21, and only the first power accumulation device 31 is coupled to the first power line 21 and the second power line 22. Therefore, the switch circuit 33 is a switch that couples the first power accumulation device 31 to the second power accumulation device 32 in parallel.

Note that, in the present embodiment, the second power line 22 has a ground voltage VSS, and a voltage VDD is applied to the IC 10.

Further, in the present embodiment, it is described that the switch circuit 33 is present between the power line 21 and the second power accumulation device 32. However, the switch circuit 33 may be present between the power line 22 and the second power accumulation device 32.

Figure 4:
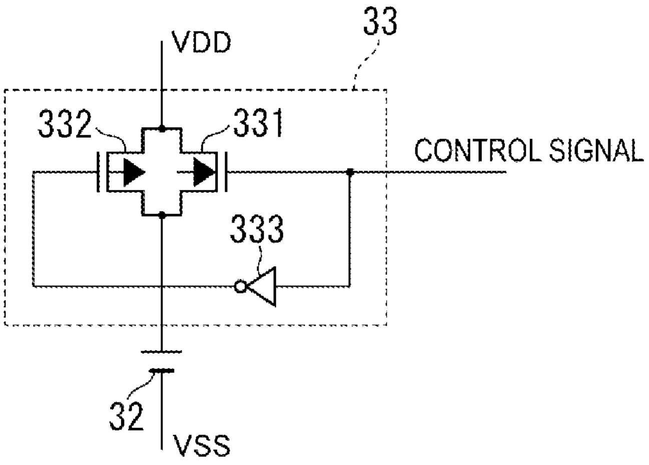
FIG. 4 is a circuit diagram illustrating a switch circuit according to the embodiment.

FIG. 4 is an example of the switch circuit 33 according to the embodiment. The switch circuit 33 illustrated in FIG. 4 is configured by an analog switch that couples the first power line 21 and the second power accumulation device 32 to each other. The switch circuit 33 includes an N-channel transistor 331, a P-channel transistor 332, and an inverter 333. Thus, a control signal input to the switch circuit 33 is at an H level, the N-channel transistor 331 and the P-channel transistor 332 are controlled to the on state. When the control signal is at an L level, the N-channel transistor 331 and the P-channel transistor 332 are controlled to the off state.

A voltage VB of the second power accumulation device 32 and a power generation voltage VG of the power generator 70 are changed. For example, when the voltage VB of the second power accumulation device 32 is reduced to a vicinity of a threshold voltage of the P-channel transistor 332, a voltage VGS between a gate and a source of the P-channel transistor 332 is reduced, an ON resistance is increased, and an electric current is less likely to flow.

Meanwhile, the voltage VGS of the N-channel transistor 331 is increased, the ON resistance is reduced, and an electric current easily flows.

In contrast, when the voltage VB of the second power accumulation device 32 is increased, the voltage VGS of the P-channel transistor 332 is increased, the ON resistance is reduced, and an electric current easily flows. Meanwhile, the voltage VGS of the N-channel transistor 331 is reduced, the ON resistance is increased, and an electric current is less likely to flow.

As described above, when the input/output voltages are changed, on-resistance reduction and linearity of input/output characteristics can be improved by using the switch circuit 33 being an analog switch circuit, as compared to when a transistor is used alone.

Figure 5:
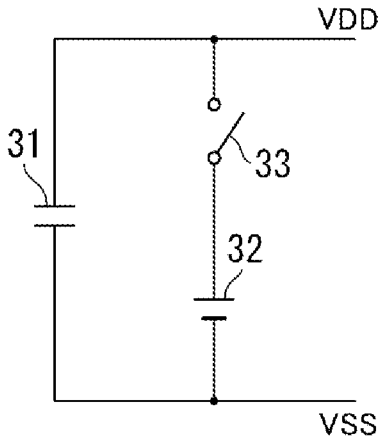
FIG. 5 is a diagram for describing an operation of the switch circuit according to the embodiment.
Figure 6:
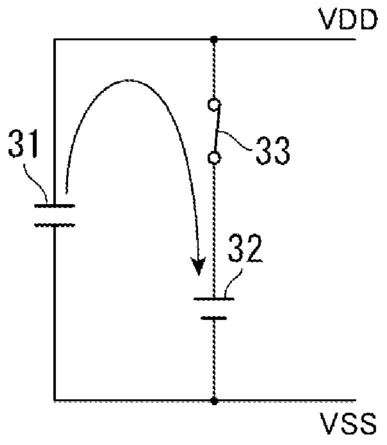
FIG. 6 is a diagram for describing an operation of the switch circuit according to the embodiment.

Further, as illustrated in FIG. 5, when the switch circuit 33 is in the off state, a voltage VC of the first power accumulation device 31 is maintained to the voltage equal to or higher than an IC stop voltage Vstop, and the IC 10 is operated. Even in this situation, in a case in which the voltage VB of the second power accumulation device 32 is reduced to a predetermined value, for example, the stop voltage Vstop of the IC 10 or lower, when the switch circuit 33 is turned on, the electric charges accumulated in the first power accumulation device 31 are discharged to the second power accumulation device 32 side, and the voltage VC of the first power accumulation device 31 and the voltage VB of the second power accumulation device 32 are reduced to voltages lower than the stop voltage Vstop of the IC 10 in some cases, as indicated with the arrow in FIG. 6.

Thus, the IC 10 includes the power voltage detection circuit 15 that detects the voltage VB of the switch circuit 33 on the second power accumulation device 32 side. Before the switch circuit 33 is turned on, the voltage VB of the second power accumulation device 32 is measured. In a case in which the voltage VB is equal to or lower than a predetermined value, for example, equal to or lower than the stop voltage Vstop of the IC 10, even when a rotation speed of the rotor 71 exceeds a predetermined first rotation speed v1, the switch circuit 33 is maintained in the off state, as described later.

When the voltages of both the first power accumulation device 31 and the second power accumulation device 32 are low, and the operation of the IC 10 is stopped, the operations of the rotation detection circuit 13, the power voltage detection circuit 15, and the like are stopped, and it is not guaranteed that correct signal are output from those circuits.

Thus, in a case in which the voltage VB of the second power accumulation device 32 is low, and the switch circuit 33 is in the on state, even when the mainspring 40 is wound to start moving the power generator 70, the electric charges flow to the second power accumulation device 32 having a large capacity. Thus, a significantly long time period is required to obtain a voltage sufficient for activating the IC 10. In view of this, the switch circuit 33 is controlled by using the oscillation stop detection circuit 16 synchronized with the oscillation stop and the oscillation start of the oscillation circuit 11. With this, when the oscillation of the IC 10 is stopped, the switch circuit 33 is turned off. As a result, the electric charges can securely be accumulated only in the first power accumulation device 31, the voltage sufficient for normally activating the IC 10 can be secured quickly.

Power Generator

As illustrated in FIG. 3, the power generator 70 includes the rotor 71 and a coil 72 that generates an induced voltage VG as the rotor 71 rotates, and supplies the electrical energy. The rotor 71 is driven by the mainspring 40 via the speed-increasing wheel train 50. The rotor 71 is magnetized with two poles. In the power generator 70, a magnetic flux changes as the rotor 71 rotates, and thus the induced voltage VG is generated at the coil 72. With this, the power is generated.

A braking circuit 73 controlled by the braking control circuit 14 and the rectifier circuit 90 are coupled to output terminals MG1 and MG2 of the coil 72 of the power generator 70. Thus, the electrical energy supplied from the power generator 70 is charged to the power supply circuit 30 via the rectifier circuit 90. In this state, when the switch circuit 33 is in the off state, only the first power accumulation device 31 is charged. When the switch circuit 33 is in the on state, the first power accumulation device 31 and the second power accumulation device 32 that are coupled in parallel to each other are charged.

Braking Circuit

The braking circuit 73 applies a brake to rotation of the rotor 71 so that the power generator 70 functions as a speed regulator. The braking circuit 73 includes a first chopping transistor 731 coupled to the output terminal MG1 to which an AC signal generated by the power generator 70 is output and a second chopping transistor 732 coupled to the output terminal MG2 to which an AC signal is output. Further, the output terminals MG1 and MG2 are short-circuited to be in a closed loop state by turning on each of the chopping transistors 731 and 732. As a result, a short brake is applied to the power generator 70.

Each of the chopping transistors 731 and 732 is coupled to the first power line 21 side.

Each of the chopping transistors 731 and 732 is configured by a P-channel field-effect transistor. A braking control signal is input from the braking control circuit 14 to a gate of each of the chopping transistors 731 and 732. Thus, while the braking control signal is at the L level, each of the chopping transistors 731 and 732 is maintained in the on state. In contrast, while the braking control signal is at the H level, each of the chopping transistors 731 and 732 is maintained in the off state, and a brake is not applied to the power generator 70. In other words, according to the level of the braking control signal, each of the chopping transistors 731 and 732 is controlled to be turned on and off. As a result, the power generator 70 can be subjected to chopping control.

Herein, the braking control signal is a signal at 128 Hz, for example. A braking force of the power generator 70 is adjusted by changing a duty ratio, based on the mechanical energy supplied from the mainspring 40. In other words, when a period at the L level is increased in one cycle of the braking control signal, a period during which each of the chopping transistors 731 and 732 is maintained in the on state and a short brake is applied is also increased. As a result, a braking force is increased. In contrast, when the period at the L level is reduced in one cycle of the braking control signal, a braking force is reduced. Therefore, a braking force can be adjusted by the duty ratio of the braking control signal.

Rectifier Circuit

The rectifier circuit 90 includes a step-up rectifier, full-wave rectifier, half-wave rectifier, transistor rectifier, or the like, and boosts and rectifies an AC output from the power generator 70 to supply the output to the power supply circuit 30.

The rectifier circuit 90 according to the present embodiment includes a first rectifier switch 91, a second rectifier switch 92, a diode 95, a diode 96, and a boosting capacitor 97.

The first rectifier switch 91 is configured by a first rectifier transistor that is coupled in parallel to the first chopping transistor 731 of the braking circuit 73 and has a gate coupled to the output terminal MG2.

Similarly, the second rectifier switch 92 is configured by a second rectifier transistor that is coupled in parallel to the second chopping transistor 732 and has a gate coupled to the output terminal MG1. Each of those rectifier transistors is also configured by a P-channel field-effect transistor.

The diodes 95 and 96 may be unidirectional elements that allow an electric current to flow in one direction, and a specific type thereof is not limited. In particular, in the watch 1 configured as an electronically controlled mechanical watch, the induced voltage of the power generator 70 is small. Thus, as the diodes 95 and 96, a schottky-barrier diode or a silicon diode with a small drop voltage or reverse leakage electric current may be used.

Note that, in the present embodiment, the first chopping transistor 731, the second chopping transistor 732, the first rectifier switch 91, the second rectifier switch 92, the diode 95, the diode 96, and the switch circuit 33 are configured inside the IC 10. The rotor 71 and the coil 72 of the power generator 70, the boosting capacitor 97, the first power accumulation device 31, and the second power accumulation device 32 are provided outside the IC 10. In this manner, when some parts of the rectifier circuit 90 are configured inside the IC 10, the number of elements mounted on the circuit board of the watch 1 can be reduced. As a result, an effect of reducing costs can be exerted.

Note that a capacity, in other words, a size of each of the chopping transistors 731 and 732 may be set based on an electric current at the time of chopping in the power generator 70.

The rectifier circuit 90 thus configured includes the boosting capacitor 97. Thus, during the charging process, the electric charges charged to the boosting capacitor 97 are also used to charge the first power accumulation device 31 and the second power accumulation device 32 of the power supply circuit 30. Thus, the voltage that can be applied to the IC 10 can be increased, and the IC 10 can be operated in a stabilized manner. Note that, in the present embodiment, the rectifier circuit 90 is a two-stage boosting rectifier circuit. Alternatively, the voltage of the power supply circuit 30 can be increased by using a diode and a capacitor and increasing the number of boosting stages such as three-stage boosting and four-stage boosting.

IC

As illustrated in FIG. 2, the IC 10 includes the oscillation circuit 11, the frequency divider circuit 12, the rotation detection circuit 13, the braking control circuit 14, the power voltage detection circuit 15, and the oscillation stop detection circuit 16. Note that IC is an abbreviation for Integrated Circuit.

The oscillation circuit 11 and the crystal oscillator 80 form a crystal oscillation circuit 100. Further, when an IC applied voltage VDD of the power supply circuit 30 falls below an oscillation stop voltage, the crystal oscillation circuit 100 stops oscillation. When the IC applied voltage VDD exceeds an oscillation start voltage, the crystal oscillation circuit 100 starts oscillation.

Note that the oscillation start voltage may be the same voltage as the oscillation stop voltage. The oscillation start voltage may be set to a voltage higher than the oscillation stop voltage so that stable oscillation continues after oscillation starts. Further, in order for the crystal oscillation circuit 100 to start oscillation, it is required to operate the oscillation circuit 11, in other words, operate the IC 10. Thus, it is only necessary for the oscillation start voltage to be a voltage equal to or higher than the voltage at which the operation of the IC 10 is started. In the present embodiment, it is assumed that the oscillation start voltage and the voltage at which the operation of the IC 10 is started are the same.

Before the IC 10 is stopped, the oscillation circuit 11 stops oscillation. Thus, the oscillation stop voltage is required to be set to a voltage higher than the stop voltage Vstop of the IC 10.

The oscillation circuit 11 outputs, to the frequency divider circuit 12, an oscillation signal at a predetermined frequency that is generated by oscillation of the crystal oscillator 80. In the present embodiment, the oscillation circuit 11 generates an oscillation signal at 32,768 Hz. Therefore, the crystal oscillation circuit 100 including the crystal oscillator 80 and the oscillation circuit 11 is an oscillation unit that outputs a clock signal at 32,768 Hz.

The frequency divider circuit 12 divides a frequency of the output of the oscillation circuit 11 to generate a clock signal at a plurality of frequencies, and outputs a necessary clock signal to the braking control circuit 14 and the power voltage detection circuit 15. The clock signal output from the frequency divider circuit 12 to the braking control circuit 14 is a reference signal that serves as a reference for rotation control of the rotor 71 of the power generator 70. In the present embodiment, a reference speed v0 of the rotor 71 of the power generator 70 is 8 Hz. Thus, the frequency divider circuit 12 generates a reference signal of 8 Hz, and outputs the reference signal to the braking control circuit 14. Further, the clock signal that is output from the frequency divider circuit 12 to the power voltage detection circuit 15 is a clock signal at a frequency corresponding to an operation cycle of the power voltage detection circuit 15.

The rotation detection circuit 13 includes a waveform shaping circuit coupled to the power generator 70 (not illustrated), and a mono-multivibrator. From an induced voltage waveform generated in the power generator 70, a rotation detection signal indicating a rotation frequency, in other words, a rotation speed of the rotor 71 is output to the braking control circuit 14.

The rotor 71 of the power generator 70 is rotated by the mechanical energy of the mainspring 40 via the speed-increasing wheel train 50. Thus, the mechanical energy of the mainspring 40 can be determined by the rotation speed of the rotor 71. Thus, the rotation detection circuit 13 determines a mechanical energy amount of the mainspring 40, based on the detection value of the rotation speed of the rotor 71, and outputs the control signal for controlling opening and closing of the switch circuit 33, based on the mechanical energy amount. Note that the physical quantity for determining the mechanical energy of the mainspring 40 that is used for control of the switch circuit 33 is not limited to the rotation speed of the rotor 71, and may be a braking amount of the power generator 70 that also serves as a speed regulator, a power generation electric current value, and a power generation voltage value, as long as the physical quantity can be used for determining a magnitude of the mechanical energy.

The braking control circuit 14 compares the rotation detection signal output from the rotation detection circuit 13 with the reference signal output from the frequency divider circuit 12, and outputs the braking control signal for regulating the speed of the power generator 70 to the braking circuit 73 of the power generator 70.

Note that, in the present embodiment, the reference signal is a signal that matches with a reference rotation speed of the rotor 71 at the time of normal hand movement. Therefore, the braking control circuit 14 outputs the braking control signal, based on a difference between the rotation detection signal corresponding to the rotation speed of the rotor 71 and the reference signal. With this, a braking force of the braking circuit 73 is adjusted, and rotation of the rotor 71 is controlled.

The power voltage detection circuit 15 is a voltage detection unit that detects the voltage VB of the second power accumulation device 32 of the power supply circuit 30 at a predetermined cycle, based on the clock signal output from the frequency divider circuit 12. Further, when the voltage VB of the second power accumulation device 32 is lower than a predetermined voltage, for example, the IC stop voltage Vstop, the power voltage detection circuit 15 outputs the control signal at the L level for switching the switch circuit 33 to the off state, without depending on the mechanical energy amount of the mainspring 40.

In contrast, when the voltage VB of the second power accumulation device 32 is equal to or higher than the predetermined voltage, the power voltage detection circuit 15 outputs the control signal at the H level that enables switching of the switch circuit 33, based on the mechanical energy amount of the mainspring 40.

The oscillation stop detection circuit 16 is an oscillation stop detection unit that detects oscillation stop of the crystal oscillation circuit 100 by monitoring the clock signal output from the oscillation circuit 11. When oscillation stop of the crystal oscillation circuit 100 is detected, the oscillation stop detection circuit 16 outputs the control signal at the L level for switching the switch circuit 33 to the off state, without depending on the mechanical energy amount of the mainspring 40.

Further, when the first power accumulation device 31 of the power supply circuit 30 is charged from a state in which the IC 10 is stopped, and the crystal oscillation circuit 100 starts oscillation, the oscillation stop detection circuit 16 outputs the control signal at the H level that enables switching of the switch circuit 33, based on the mechanical energy amount of the mainspring 40.

As illustrated in FIG. 3 and FIG. 4, the switch circuit 33 of the power supply circuit 30 is subjected to switching control between the on state and the off state by the rotation detection circuit 13, the power voltage detection circuit 15, and the oscillation stop detection circuit 16. Herein, the power voltage detection circuit 15 and the oscillation stop detection circuit 16 execute control of maintaining the switch circuit 33 in the off state. When the power voltage detection circuit 15 and the oscillation stop detection circuit 16 do not maintain the switch circuit 33 in the off state, the rotation detection circuit 13 executes control of switching the switch circuit 33 between the on state and the off state.

Thus, the control signals that are output from the rotation detection circuit 13, the power voltage detection circuit 15, and the oscillation stop detection circuit 16 are input to the switch circuit 33 via an AND circuit. Further, while the power voltage detection circuit 15 or the oscillation stop detection circuit 16 outputs the control signal at the L level, the switch circuit 33 is maintained in the off state. Further, while both the power voltage detection circuit 15 and the oscillation stop detection circuit 16 output the control signals at the H level, the switch circuit 33 is switched between the on state and the off state by the control signal output from the rotation detection circuit 13.

Control of Power Supply Circuit

Figure 7:
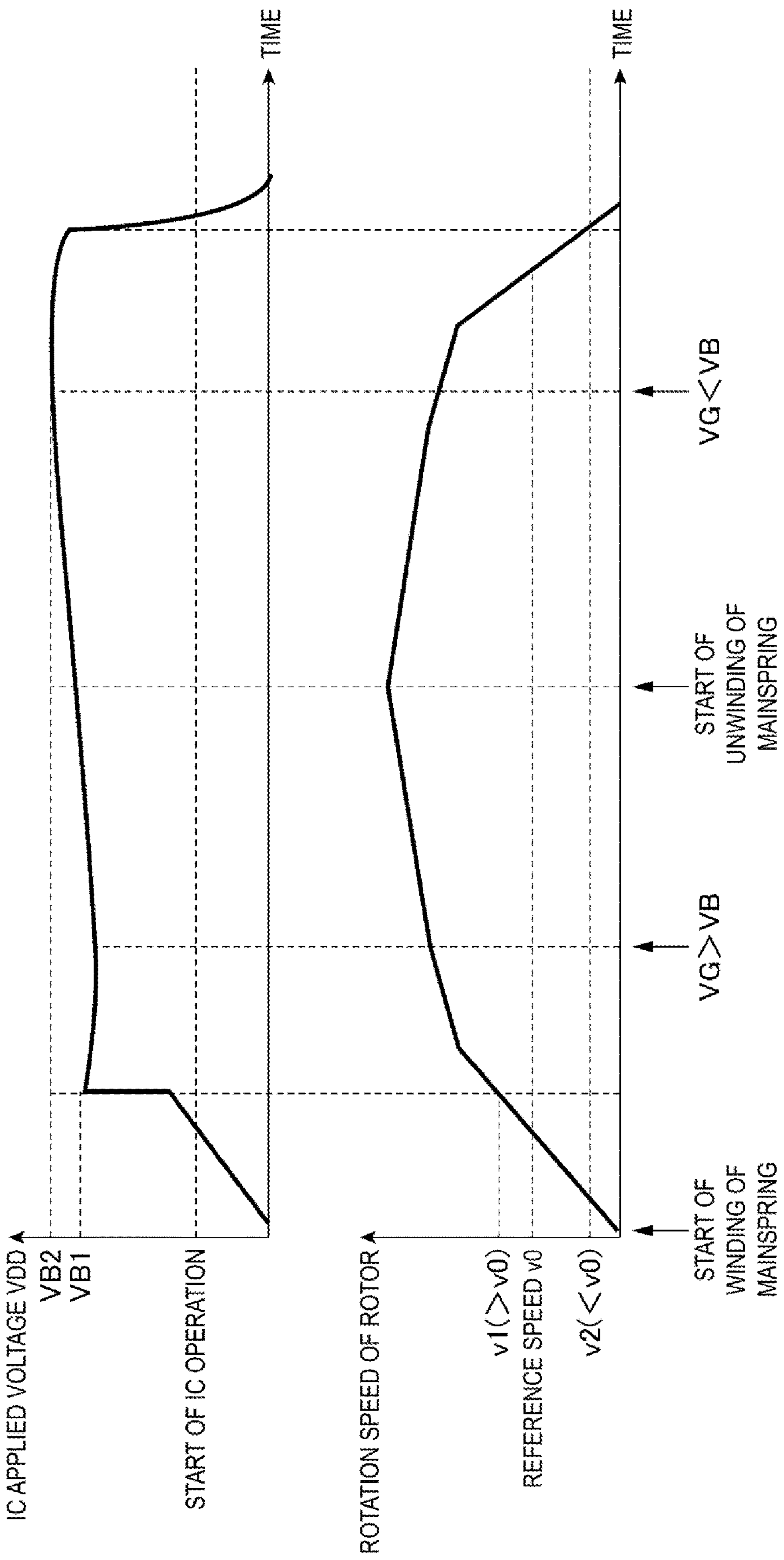
FIG. 7 is a timing chart of a rotation speed of a rotor and an IC applied voltage.

Next, with reference to the timing chart in FIG. 7, description is made on control of the power supply circuit 30 by the IC 10, specifically, on/off control of the switch circuit 33. Note that the rotation speed of the rotor shown in FIG. 7 indicates the mechanical energy of the mainspring 40, and indicates a change of the rotation speed of the rotor 71 in a non-braking state without applying a short brake.

The mainspring 40 is wound up from a state in which the mainspring 40 is unwound and the IC 10 is also stopped. In this case, the rotor 71 is rotated by the mechanical energy accumulated in the mainspring 40, and the rotation speed is also increased. Note that, as the IC 10 is stopped, the crystal oscillation circuit 100 is also stopped. Thus, the oscillation stop detection circuit 16 outputs the control signal at the L level, and the switch circuit 33 is controlled to the off state.

As the rotation speed of the rotor 71 is increased, the first power accumulation device 31 is charged with the electric charges generated by the power generator 70, via the rectifier circuit 90, and the IC applied voltage VDD is increased. The first power accumulation device 31 is a small-capacity capacitor, and hence the IC applied voltage VDD is increased relatively quickly.

When the IC applied voltage VDD exceeds the voltage at which the operation of the IC 10 is started, in other words, the oscillation start voltage, the IC 10 causes the oscillation circuit 11 to oscillate the crystal oscillator 80, and starts rotation control of the rotor 71. With rotation control, in actuality, the rotor 71 is controlled to maintain the reference speed v0. When oscillation of the crystal oscillator 80 is detected, the oscillation stop detection circuit 16 outputs the control signal at the H level to the switch circuit 33. Further, the power voltage detection circuit 15 is also operated to output the control signal corresponding to the voltage VB of the second power accumulation device 32. Herein, it is assumed that the power voltage detection circuit 15 outputs the control signal at the H level. In other words, the second power accumulation device 32 is prevented from wasteful discharging by the switch circuit 33, and is rarely reduced to a voltage lower than the predetermined voltage. Thus, in general, the power voltage detection circuit 15 outputs the control signal at the H level.

When the IC 10 starts rotation control, the rotation detection circuit 13 detects whether the rotation speed of the rotor 71 in a non-braking state exceeds the first rotation speed v1. The first rotation speed v1 may be a speed higher than the reference speed v0 of the rotor 71, for example, 9 Hz, and may be set to approximately 110% to 120% of the reference speed v0.

The first rotation speed v1 is a first set value of the mechanical energy amount that is a condition for controlling the switch circuit 33 from the off state to the on state.

Thus, when it is detected that the rotation speed of the rotor 71 is increased and exceeds the predetermined first rotation speed v1 as the mainspring 40 is wound up, the rotation detection circuit 13 outputs the control signal at the H level to the switch circuit 33 to turn on the switch circuit 33. In this state, when the voltage VB of the second power accumulation device 32 that is detected by the power voltage detection circuit 15 is equal to or higher than the IC stop voltage Vstop, and the oscillation stop detection circuit 16 does not detect the oscillation stop, the power voltage detection circuit 15 and the oscillation stop detection circuit 16 do not output the signal at the L level that causes the switch circuit 33 to be in the off state. Thus, due to the control signal from the rotation detection circuit 13, the switch circuit 33 is switched from the off state to the on state.

When the switch circuit 33 is in the on state, the first power accumulation device 31 and the second power accumulation device 32 are coupled in parallel to each other. The second power accumulation device 32 has a capacity larger than the first power accumulation device 31, and hence the IC applied voltage VDD is at the voltage level of the second power accumulation device 32. For example, when a value of the voltage VB of the second power accumulation device 32 is VB1, the IC applied voltage VDD is also increased to VB1. Thus, the IC 10 is driven by the electrical energy accumulated in the second power accumulation device 32.

When the switch circuit 33 is in the on state, the first power accumulation device 31 is charged by the second power accumulation device 32 at the voltage level higher than the first power accumulation device 31. Further, the IC 10 is driven by the electrical energy of the second power accumulation device 32, and hence the voltage of the second power accumulation device 32 is gradually reduced.

Moreover, when the mechanical energy is increased by winding up the mainspring 40, and the rotation speed of the rotor 71 is increased, the power generation voltage VG of the power generator 70 is equal to or higher than the voltage VB of the second power accumulation device 32. Thus, the second power accumulation device 32 is charged by the power generator 70, and the voltage VB of the second power accumulation device 32 is gradually increased.

When winding of the mainspring 40 is completed, and unwinding of the mainspring 40 is started, the rotation speed of the rotor 71 in a non-braking state is gradually reduced. However, while the power generation voltage VG exceeds the voltage VB of the second power accumulation device 32, the second power accumulation device 32 is charged by the power generator 70, and the voltage VB of the second power accumulation device 32 is increased. In FIG. 7, until the power generation voltage VG falls below the voltage VB of the second power accumulation device 32, the voltage of the second power accumulation device 32 is increased and arrives at a voltage VB2.

When the power generation voltage VG falls below the voltage VB of the second power accumulation device 32, the IC 10 is driven by the electrical energy accumulated in the second power accumulation device 32. Thus, the electrical energy accumulated in the second power accumulation device 32 is reduced, and the voltage VB of the second power accumulation device 32 is also reduced.

When the rotation speed of the rotor 71 is reduced and falls below a predetermined second rotation speed v2, the rotation detection circuit 13 outputs the control signal at the L level to switch the switch circuit 33 to be in the off state. Note that the second rotation speed v2 may be set to a speed lower than the reference speed v0, for example, 7 Hz, may be set to approximately 80% to 90% of the reference speed v0. The second rotation speed v2 is a second set value of the mechanical energy amount that is a condition for controlling the switch circuit 33 from the on state to the off state. Thus, the first rotation speed v1 being the first set value is set to a value greater than the second rotation speed v2 being the second set value.

When the switch circuit 33 is in the off state, the second power accumulation device 32 is decoupled from the first power accumulation device 31 and the IC 10, and hence maintains the voltage directly before turning off the switch circuit 33.

Further, the IC 10 is driven by the electrical energy accumulated in the first power accumulation device 31. The first power accumulation device 31 is a small-capacity capacitor. When the mechanical energy of the mainspring 40 is reduced, and a power generation amount of the power generator 70 is small, the IC applied voltage VDD is suddenly reduced. Thus, when the voltage level of the first power accumulation device 31, in other words, the IC applied voltage VDD falls below the oscillation stop voltage, oscillation of the crystal oscillation circuit 100 is stopped, and the oscillation stop detection circuit 16 outputs the control signal at the L level. Further, the operation of the power voltage detection circuit 15 is also stopped. Moreover, when the voltage of the first power accumulation device 31 falls below the IC stop voltage Vstop, the IC 10 is stopped.

After that, when the mainspring 40 is wound up, the IC 10 repeats the above-mentioned operation.

Figure 8:
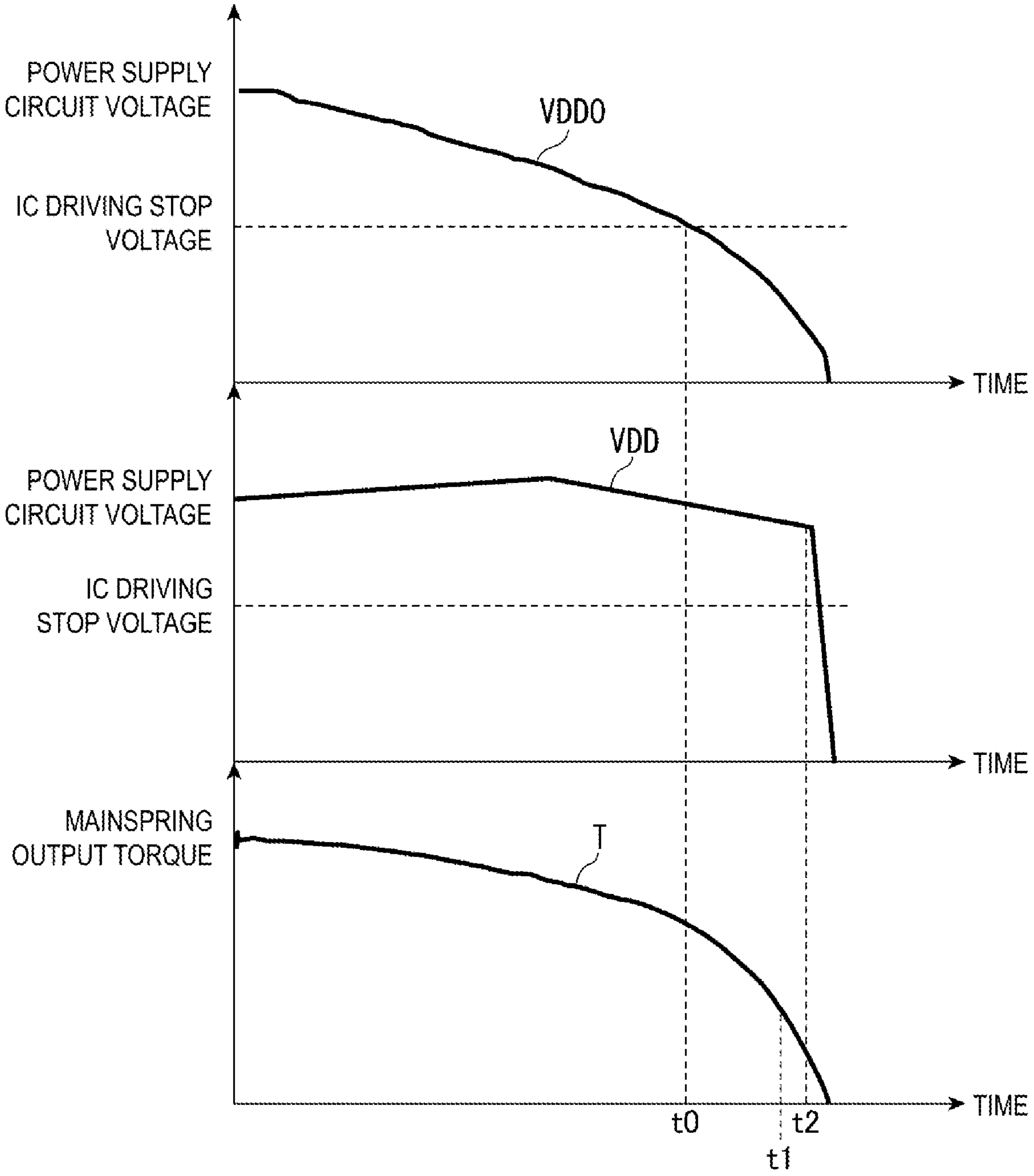
FIG. 8 is a graph showing a relationship between an output torque of a mainspring and a power supply circuit voltage.

FIG. 8 is a graph showing a relationship between a time and each of a voltage VDD0 of a power supply circuit in a comparative example in which the second power accumulation device 32 and the switch circuit 33 are not provided, the voltage VDD of the power supply circuit 30 according to the present embodiment, and an output torque T of the mainspring 40.

As shown in FIG. 8, in the comparative example in which only the first power accumulation device 31 is provided as a power supply circuit, the capacity of the first power accumulation device 31 is small, and hence the voltage VDD0 of the power supply circuit is proportional to the power generation voltage of the power generator 70. Thus, as the output torque T of the mainspring 40 is reduced, the power generation voltage of the power generator 70 is reduced. In this case, the voltage VDD0 of the power supply circuit is also reduced. A time period to a time to at which the voltage VDD0 is reduced to the IC stop voltage Vstop to disable speed regulation is a duration during which timekeeping accuracy of the watch can be maintained.

Meanwhile, in addition to the first power accumulation device 31, the power supply circuit 30 according to the present embodiment includes the second power accumulation device 32 having a large capacity. Thus, as described above, even at the final stage of unwinding when the output torque T of the mainspring 40 is reduced, the voltage VDD of the power supply circuit 30 can be maintained to the IC stop voltage Vstop or higher. Thus, even at the final stage of unwinding of the mainspring 40, the IC 10 is not stopped due to reduction of the voltage VDD of the power supply circuit 30, and accurate speed regulation can be performed as long as the rotor 71 is continuously rotated at the reference speed v0 or higher. Therefore, at a time t1, the rotation speed of the rotor 71 is reduced to the reference speed v0 or lower due to reduction of the output torque T of the mainspring 40, and the time starts to lag regardless of speed regulation control. A time period to the time t1 is a duration during which timekeeping accuracy of the watch 1 can be maintained. The duration t1 can be longer than the duration to. Note that, at a time t2, the rotor 71 falls below the second rotation speed v2, and the switch circuit 33 is in the off state. Thus, as described above, the IC applied voltage VDD is suddenly reduced.

Effects of Embodiment

The electronically controlled mechanical watch 1 according to the present embodiment is provided with the power supply circuit 30 including the first power accumulation device 31 and the second power accumulation device 32 that is coupled in parallel to the first power accumulation device 31 via the switch circuit 33 and has a capacity larger than the first power accumulation device 31. Thus, when there is an excessive amount of the output torque T of the mainspring 40, the generated power can be accumulated in the second power accumulation device 32. Thus, when the output torque T of the mainspring 40 is reduced, the voltage to be applied to the IC 10 can be maintained to the IC stop voltage Vstop or higher, due to the power accumulated in the second power accumulation device 32. Thus, the operation of the IC 10 can be continued. Therefore, even when the output torque T is reduced at the final stage of unwinding of the mainspring 40, early stopping of the IC 10 can be prevented. Thus, as compared to when the power supply circuit is constituted only by the first power accumulation device 31, the duration during which accurate speed regulation is performed can be increased.

Further, when the rotation speed of the rotor 71 falls below the second rotation speed v2, the rotation detection circuit 13 switches the switch circuit 33 to the off state. Thus, discharging from the second power accumulation device 32 can be prevented. Thus, when the mainspring 40 is wound up again, and the rotation speed of the rotor 71 exceeds the first rotation speed v1 to switch the switch circuit 33 to the on state, the IC applied voltage VDD can be prevented from falling below the IC stop voltage Vstop.

Only the second power accumulation device 32 and the switch circuit 33 are added to the power supply circuit 30, and the existing power generator 70 that also serves as a speed regulator is used. Thus, a new power generator is not required. As a result, the movement can be prevented from being increased in size, and a degree of freedom in design can be improved.

Further, the switch circuit 33 is provided, and the second power accumulation device 32 is configured to perform charging when there is an excessive amount of the output torque T of the mainspring 40. Thus, reduction of the voltage of the power supply circuit 30 can be prevented, and an effect of increasing the duration can be exerted for a long time period.

Moreover, the first power accumulation device 31 is a small-capacity capacitor. Thus, when the switch circuit 33 is in the off state, for example, when winding of the mainspring 40 is started, the IC applied voltage VDD can be increased quickly, and the time period required for exceeding the voltage at which the operation of the IC 10 is started and starting the operation of the IC 10 can be reduced.

When the rotation speed of the rotor 71 exceeds the first rotation speed v1, the rotation detection circuit 13 switches the switch circuit 33 to the on state. When the rotation speed of the rotor 71 falls below the second rotation speed v2 being a speed lower than the first rotation speed v1, the rotation detection circuit 13 switches the switch circuit 33 to the off state. Thus, the threshold value for on/off control of the switch circuit 33 can be provided with hysteresis, and the first rotation speed v1 being a set value for turning on the switch circuit 33 can be set to a greater value. Thus, the switch circuit 33 can be turned on in a state in which the mainspring 40 is securely wound up. Wasteful discharging from the second power accumulation device 32 can be prevented in a state in which the time indicated by the hands 4 lags regardless of speed regulation control due to a low torque of the mainspring 40.

Further, the second rotation speed v2 being a set value for switching the switch circuit 33 to the off state can be set to a less value. Thus, in a state in which the mainspring 40 is securely unwound, the switch circuit 33 can be turned off. Thus, in a case in which the correct time can be indicated by performing speed regulation control by the IC 10, when the rotation speed of the rotor 71 is temporarily reduced to the reference speed v0 or lower due to a posture of the watch 1, supply of the electrical energy from the second power accumulation device 32 can be prevented from being stopped. In turn, the duration can be increased.

When the voltage of the second power accumulation device 32 is significantly reduced to, for example, the IC stop voltage Vstop or lower, the power voltage detection circuit 15 maintains the switch circuit 33 in the off state. Thus, the electric charges accumulated in the first power accumulation device 31 can be prevented from being discharged to the second power accumulation device 32 via the switch circuit 33, the IC applied voltage VDD can be prevented from falling below the IC stop voltage Vstop of the IC 10, and the IC 10 can be prevented from being stopped. Thus, in a case in which the voltage of the second power accumulation device 32 is lower than the predetermined voltage, even when the mechanical energy of the mainspring 40 exceeds the predetermined value, the switch circuit 33 is prevented from being switched to the on state. Thus, the operation stop of the IC 10 due to reduction of the voltage can be prevented, and a state in which speed regulation is disabled can be prevented.

When the voltage is low, for example, when the crystal oscillation circuit 100 stops oscillation, the operations of the rotation detection circuit 13, the power voltage detection circuit 15, and the like are also stopped, and the control signal output to the switch circuit 33 is not secured. Thus, in a case in which the voltage VB of the second power accumulation device 32 is low, and the switch circuit 33 is in the on state, even when the mainspring 40 is wound to start moving the power generator 70, the electric charges flow to the second power accumulation device 32 having a large capacity. Thus, a significantly long time period is required to obtain a voltage sufficient for activating the IC 10.

In the present embodiment, the switch circuit 33 is controlled by using the oscillation stop detection circuit 16 synchronized with the oscillation stop and the oscillation start. With this, the electric charges can securely be accumulated only in the first power accumulation device 31 without passing through the switch circuit 33 by maintaining the switch circuit 33 in the off state while the IC 10 stops oscillation. As a result, the voltage required for activating the IC 10 normally can be secured quickly.

In the electronically controlled mechanical watch 1, the IC 10 detects the rotation speed of the rotor 71, and braking control corresponding to the rotation speed is performed. With this, the speed is regulated.

Thus, when the rotation speed of the rotor 71 is detected, the mechanical energy of the IC 10 is measured at the same time. A dedicated measurement circuit is not required, and hence the circuit configuration can be simplified.

Modification Example

Note that the present disclosure is not limited to the above-described embodiment, and may be modified and changed in as long as the advantages of the present disclosure can be achieved.

Figure 9:
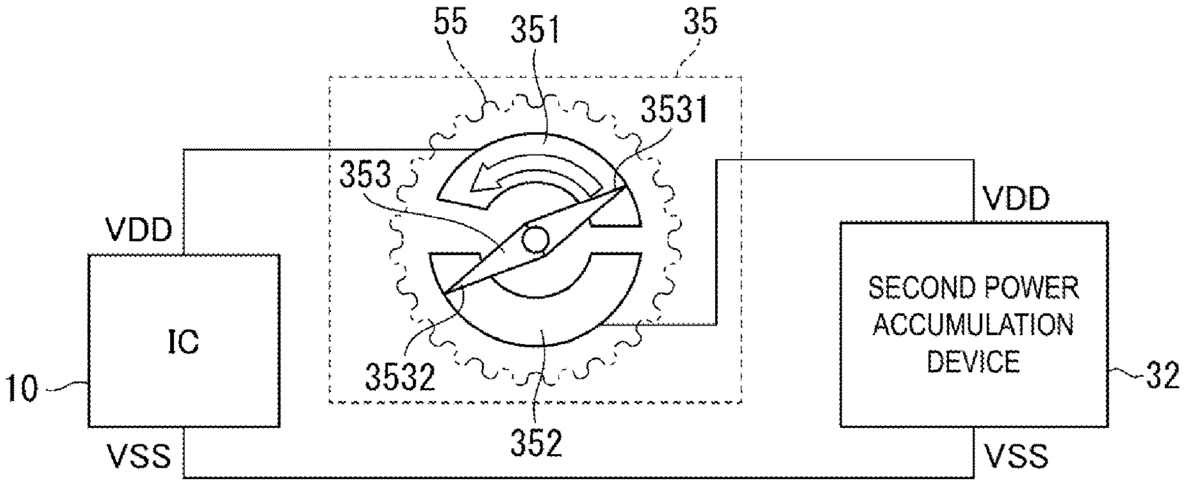
FIG. 9 is a diagram illustrating a configuration of a switch in a modification example.
Figure 10:
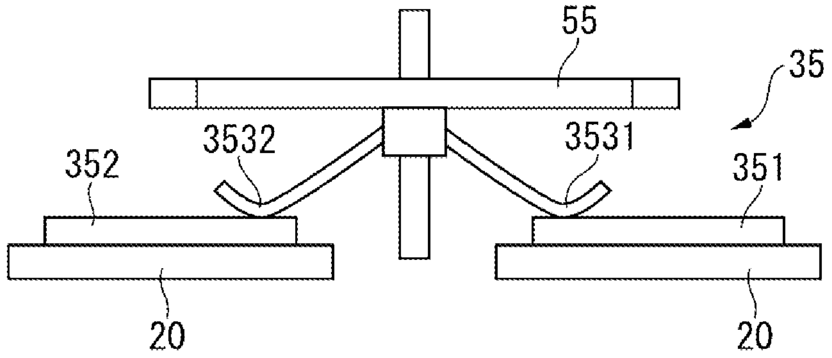
FIG. 10 is a diagram illustrating the configuration of the switch in the modification example.
Figure 11:
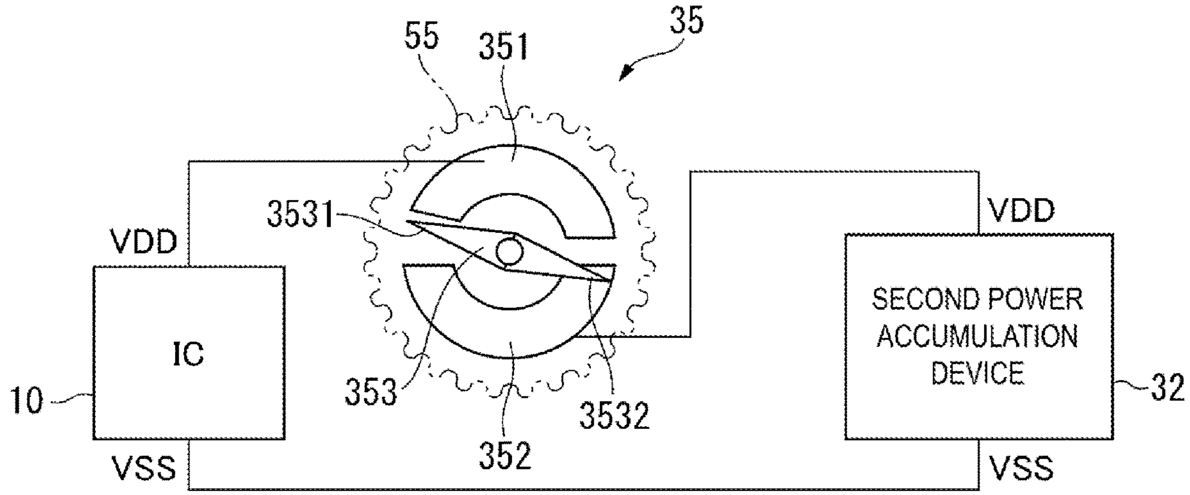
FIG. 11 is a diagram illustrating the configuration of the switch in the modification example.

The switch not limited to the switch circuit 33 according to the embodiment. For example, as illustrated in FIG. 9 to FIG. 11, there may be used a mechanical switch 35 in conjunction with winding up and unwinding of the mainspring 40. The mechanical switch 35 includes a first electrode 351 coupled to the first power line 21 of the IC 10, a second electrode 352 coupled to the first power line 21 of the second power accumulation device 32, and a conductive spring 353 that can be conducted to the first electrode 351 and the second electrode 352. The conductive spring 353 is attached to a toothed gear 55 of the power reserve wheel train for moving the power reserve hand 5.

As illustrated in FIG. 9 and FIG. 10, the first electrode 351 and the second electrode 352 are formed having an arc shape in plan view, and are separated from each other on a circuit board 20.

The conductive spring 353 includes a first conductive portion 3531 that can come into contact with the first electrode 351 and a second conductive portion 3532 that can come into contact with the second electrode 352.

Herein, when the mainspring 40 is wound up, the toothed gear 55 of the power reserve wheel train is rotated in the clockwise direction in FIG. 9, and the conductive spring 353 is also rotated in the clockwise direction integrally with the toothed gear 55. In contrast, when the mainspring 40 is unwound, the toothed gear 55 of the power reserve wheel train is rotated in the counterclockwise direction in FIG. 9, and the conductive spring 353 is also rotated in the counterclockwise direction integrally with the toothed gear 55. In a fully wound state of the mainspring 40, as illustrated in FIG. 9, the first conductive portion 3531 comes into contact with the end of the first electrode 351 in the clockwise direction, and the second conductive portion 3532 comes into contact with the end of the second electrode 352 in the clockwise direction. As a result, the conductive spring 353 conducts the VDD terminal of the second power accumulation device 32 and the VDD terminal of the IC 10 with each other. Thus, it is assumed that the mechanical switch 35 is in an on state.

When the mainspring 40 starts being unwound, the toothed gear 55 and the conductive spring 353 are rotated in the arrow direction in FIG. 9, in other words, in the counterclockwise direction, the conductive spring 353 maintains the conduction state between the first electrode 351 and the second electrode 352, and the mechanical switch 35 is maintained in the on state.

Meanwhile, at the final stage of unwinding of the mainspring 40, in other words, when the winding-up amount of the mainspring 40 falls below the predetermined amount, the first conductive portion 3531 is moved to the position deviated from the first electrode 351, as illustrated in FIG. 11. Thus, the mechanical switch 35 is switched to the off state.

Even when the mechanical switch 35 thus configured is used, the mechanical switch 35 is switched between the on state and the off state, in conjunction with the winding-up amount of the mainspring 40. Thus, a function similar to the switch circuit 33 can be achieved.

The second power accumulation device 32 is charged at the time of shipping the electronically controlled mechanical watch 1 from a factory. Then, during a normal use, wasteful discharging is prevented by control of the switch circuit 33. Thus, the voltage VB of the second power accumulation device 32 is less likely to be reduced to the IC stop voltage Vstop or less. However, when the voltage VB of the second power accumulation device 32 is reduced to the IC stop voltage Vstop or lower, the power voltage detection circuit 15 maintains the switch circuit 33 in the off state. Thus, the second power accumulation device 32 cannot be charged. Thus, the electronically controlled mechanical watch 1 may include a charging mode in which the switch circuit 33 is forcefully set to be in the on state to charge the second power accumulation device 32.

In the embodiment, the first rotation speed v1 being the first set value is set to a value greater than the second rotation speed v2 being the second set value. Alternatively, the first set value and the second set value may be set to the same value.

Further, the second rotation speed v2 being the second set value is set to a value less than the reference speed v0 of the rotor 71. Alternatively, the second rotation speed v2 may be set to the same value as the reference speed v0.

Moreover, in the embodiment, the IC 10 being a control unit includes the power voltage detection circuit 15 and the oscillation stop detection circuit 16. Alternatively, the IC 10 may perform on/off control for the switch circuit 33 only by the rotation detection circuit 13 without including those circuits.

In the embodiment, the rotor 71 of the power generator 70 that also serves as a speed regulator is rotated by the mechanical energy from the mainspring 40, and the rotation speed of the rotor 71 is subjected to speed regulation control. With this, the electronically controlled mechanical watch 1 controls the movement speed of each of the hands 4. However, the embodiment is not limited thereto. For example, when the wheel train that transmits the mechanical energy from the mainspring 40 is subjected to speed regulation by using an escape wheel and a pinion, a pallet fork, and a balance with a hairspring, the embodiment may be applied to an electronically controlled mechanical watch that in which speed regulation is performs for the operation of balance with a hairspring by detecting vibration of the balance with a hairspring.

CONCLUSION

An electronically controlled mechanical watch according to the present disclosure includes a mainspring, a wheel train configured to transmit mechanical energy of the mainspring, a hand driven by the wheel train to display the time, a speed regulator configured to control a rotation cycle of the wheel train, a control unit configured to control the speed regulator, a power generator configured to convert the mechanical energy of the mainspring to electrical energy, a first power accumulation device configured to accumulate the electrical energy of the power generator and supply the electrical energy to the control unit, a second power accumulation device coupled to the first power accumulation device in parallel via a switch and configured to accumulate the electrical energy, and a detection unit configured to detect a mechanical energy amount accumulated in the mainspring, wherein, in a case in which the switch is in an off state, when the detection unit detects that the mechanical energy amount exceeds a first set value, the control unit controls the switch from the off state to an on state, and in a case in which the switch is in the on state, when the detection unit detects that the mechanical energy amount falls below a second set value, the control unit controls the switch from the on state to the off state.

With the electrically controlled mechanical watch according to the present disclosure, when the mechanical energy accumulated in the mainspring exceeds the first set value, the switch is controlled to the on state, and the second power accumulation device is coupled in parallel to the first power accumulation device. Thus, when there is an excessive amount of the mechanical energy of the mainspring, the power generated by the power generator can be accumulated in the second power accumulation device. Thus, even when the mechanical energy accumulated in the mainspring is reduced at the final stage of unwinding of the mainspring, and the generated power is reduced, the operation of the control unit can be continued because the second power accumulation device is provided in addition to the first power accumulation device. Thus, as compared to when only the first power accumulation device is provided, the duration in which the hands can be subjected to correct speed regulation can be increased.

Further, when the mechanical energy accumulated in the mainspring falls below the second set value, the switch is controlled to the off state. Thus, discharging from the second power accumulation device can be prevented, and the voltage of the second power accumulation device can be maintained at a high level. Thus, when the mainspring is wound up again, the mechanical energy exceeds the first set value, and the switch is switched to the on state, the voltages of the first power accumulation device and the second power accumulation device can be prevented from being significantly reduced, and the control unit can be prevented from being stopped.

Moreover, in addition to the first power accumulation device, the second power accumulation device and the switch may be added. A power generator for an additional power source is not required. As a result, the movement can be prevented from being increased in size, and a degree of freedom in design can be improved.

In the electrically controlled mechanical watch according to the present disclosure, the first set value may be greater than the second set value.

The first set value is set to a value greater than the second set value. Thus, the threshold value for on/off control of the switch can be provided with hysteresis, and the first set value for turning on the switch can be set to a greater value. Thus, the switch can be turned on in a state in which the mainspring is securely wound up. Wasteful discharging from the second power accumulation device can be prevented in a state in which the time indicated by the hands lags regardless of speed regulation control due to a low torque of the mainspring.

Further, the second set value for switching the switch to the off state can be set to a less value. Thus in a state in which the mainspring is securely unwound, the switch can be turned off. Thus, in a state in which the correct time can be indicated by performing speed regulation by the control unit, supply of the electrical energy from the second power accumulation device can be prevented from being stopped. In turn, the duration can be increased.

In the electrically controlled mechanical watch according to the present disclosure, the power generator may include a rotor, and the second set value may be a value at which a rotation speed of the rotor is equal to or lower than a reference speed.

In a case in which the second set value is set to the reference speed of the rotor, when the rotation speed of the rotor is temporarily reduced to the reference speed or less due to a posture of the electronically controlled mechanical watch, the switch is controlled to be turned off. As a result, speed regulation control may be terminated.

In contrast, when the value at which the rotation speed of the rotor is the reference speed or less is set to the second set value, the switch can be controlled to be turned off when the mechanical energy is securely reduced. As a result, the duration can be increased.

In the electrically controlled mechanical watch according to the present disclosure, an accumulated power amount accumulated in the second power accumulation device may be greater than an accumulated power amount accumulated in the first power accumulation device.

The accumulated power amount accumulated in the second power accumulation device, in other words, the capacity of the second power accumulation device is larger than the first power accumulation device. Thus the duration can be increased by using the large-capacity second power accumulation device. Further, the first power accumulation device can be configured by a small-capacity capacitor or the like. Thus, the switch can be turned off, and only the first power accumulation device can be charged by the power generator. As a result, at the time of starting winding-up of the mainspring, the voltage of the first power accumulation device can be increased quickly to a level that enables driving of the control unit, and the time period until the control unit is operated can be reduced.

The electrically controlled mechanical watch according to the present disclosure may include an oscillation unit configured to output a clock signal, and an oscillation stop detection unit configured to detect stop of the oscillation unit. When the oscillation stop detection unit detects stop of the oscillation unit, the control unit may maintain the switch in the off state.

While the oscillation unit stops oscillation, the switch is maintained in the off state, and hence only the first power accumulation device can be charged by the power generator. Thus, at the time of starting winding-up of the mainspring, the voltage of the first power accumulation device can be increased quickly to a level that enables driving of the control unit, and the time period until the control unit is operated can be reduced.

The electrically controlled mechanical watch according to the present disclosure may include a voltage detection unit configured to detect a voltage of the second power accumulation device. In a case in which the voltage detection unit detects that the voltage of the second power accumulation device is equal to or lower than a predetermined value, even when it is detected that the mechanical energy amount exceeds the first set value, the control unit may maintain the switch in the off state.

With the electrically controlled mechanical watch according to the present disclosure, when the voltage of the second power accumulation device is reduced to the predetermined value or lower, the switch is maintained in the off state. Thus, when the switch is turned on, the electric charges of the first power accumulation device can be prevented from being discharged to the second power accumulation device, and the operation of the control unit can be prevented from being stopped due to reduction of the voltage.

In the electrically controlled mechanical watch according to the present disclosure, the power generator may include a rotor coupled to the wheel train, and the detection unit may detect the mechanical energy amount, based on a rotation speed of the rotor.

With the electrically controlled mechanical watch according to the present disclosure, the rotation speed of the rotor that is detected for speed regulation control is also used for detection of the mechanical energy amount. Thus, a dedicated detection circuit for detecting the mechanical energy amount is not required, and hence the circuit configuration can be simplified.

An electronically controlled mechanical watch according to the present disclosure includes a mainspring, a wheel train configured to transmit mechanical energy of the mainspring, a hand driven by the wheel train to display the time, a speed regulator configured to control a rotation cycle of the wheel train, a control unit configured to control the speed regulator, a power generator configured to convert the mechanical energy of the mainspring to electrical energy, a first power accumulation device configured to accumulate the electrical energy of the power generator and supply the electrical energy to the control unit, a second power accumulation device coupled to the first power accumulation device in parallel and configured to accumulate the electrical energy, a switch arranged between the first power accumulation device and the second power accumulation device and configured to switch a coupling state between the first power accumulation device and the second power accumulation device, wherein, when a winding-up amount of the mainspring exceeds a predetermined value, the switch is switched from an off state to an on state, and couples the second power accumulation device to the first power accumulation device, and when the winding-up amount of the mainspring falls below the predetermined value, the switch is switched from the on state to the off state, and decouples the second power accumulation device from the first power accumulation device.

With the electrically controlled mechanical watch according to the present disclosure, there is used the switch that is switched from the off state to the on state when the winding-up amount of the mainspring exceeds the predetermined value, and is switched from the on state to the off state when the winding-up amount of the mainspring falls below the predetermined value. Thus, when there is an excessive amount of the mechanical energy of the mainspring, the power generated by the power generator can be accumulated in the second power accumulation device. Thus, even when the mechanical energy accumulated in the mainspring is reduced at the final stage of unwinding of the mainspring, and the generated power is reduced, the operation of the control unit can be continued because the second power accumulation device is provided in addition to the first power accumulation device. Thus, as compared to when only the first power accumulation device is provided, the duration in which the hands can be subjected to correct speed regulation can be increased.

Further, when the winding-up amount of the mainspring falls below the predetermined amount, the switch is controlled to the off state. Thus, discharging from the second power accumulation device can be prevented, and the voltage of the second power accumulation device can be maintained at a high level. Thus, when the mainspring is wound up gain, and the switch is switched to the on state, the voltages of the first power accumulation device and the second power accumulation device can be prevented from being significantly reduced, and the control unit can be prevented from being stopped.

Moreover, in addition to the first power accumulation device, the second power accumulation device and the switch may be added. A power generator for an additional power source is not required. As a result, the movement can be prevented from being increased in size, and a degree of freedom in design can be improved.

What is claimed is:

1. An electrically controlled mechanical watch comprising:

a mainspring;

a wheel train configured to transmit mechanical energy of the mainspring;

a hand driven by the wheel train to display the time;

a speed regulator configured to control a rotation cycle of the wheel train;

a control circuit configured to control the speed regulator;

a power generator configured to convert the mechanical energy of the mainspring to electrical energy;

a first power accumulation device configured to accumulate the electrical energy of the power generator and supply the electrical energy to the control circuit;

a second power accumulation device coupled to the first power accumulation device in parallel via a switch and configured to accumulate the electrical energy; and a rotation detection circuit configured to detect a rotation speed of a rotor of the power generator to determine a mechanical energy amount accumulated in the mainspring, wherein in a case in which the switch is in an off state, when the rotation detection circuit detects that the mechanical energy amount exceeds a first set value, the control circuit controls the switch from the off state to an on state, and in a case in which the switch is in the on state, when the rotation detection circuit detects that the mechanical energy amount falls below a second set value, the control circuit controls the switch from the on state to the off state.

2. The electrically controlled mechanical watch according to claim 1, wherein the first set value is greater than the second set value.

3. The electrically controlled mechanical watch according to claim 1, wherein the power generator includes a rotor, and the second set value is a value at which a rotation speed of the rotor is equal to or lower than a reference speed.

4. The electrically controlled mechanical watch according to claim 1, wherein an accumulated power amount accumulated in the second power accumulation device is greater than an accumulated power amount accumulated in the first power accumulation device.

5. The electrically controlled mechanical watch according to claim 1, further comprising:

an oscillation circuit configured to output a clock signal; and an oscillation stop detection circuit configured to detect stop of the oscillation circuit, wherein when the oscillation stop detection circuit detects stop of the oscillation circuit, the control circuit maintains the switch in the off state.

6. The electrically controlled mechanical watch according to claim 1, further comprising:

a voltage detection circuit configured to detect a voltage of the second power accumulation device, wherein in a case in which the voltage detection circuit detects that the voltage of the second power accumulation device is equal to or lower than a predetermined value, even when it is detected that the mechanical energy amount exceeds the first set value, the control circuit maintains the switch in the off state.

7. The electrically controlled mechanical watch according to claim 1, wherein the power generator includes a rotor coupled to the wheel train, and the rotation detection circuit detects the mechanical energy amount, based on a rotation speed of the rotor.

8. An electrically controlled mechanical watch comprising:

a mainspring;

a wheel train configured to transmit mechanical energy of the mainspring;

a hand driven by the wheel train to display the time;

a speed regulator configured to control a rotation cycle of the wheel train;

a control circuit configured to control the speed regulator;

a power generator configured to convert the mechanical energy of the mainspring to electrical energy;

a first power accumulation device configured to accumulate the electrical energy of the power generator and supply the electrical energy to the control circuit;

a second power accumulation device coupled to the first power accumulation device in parallel and configured to accumulate the electrical energy;

a switch arranged between the first power accumulation device and the second power accumulation device and configured to switch a coupling state between the first power accumulation device and the second power accumulation device; and a voltage detection circuit configured to detect a voltage of the second power accumulation device, wherein when a winding-up amount of the mainspring exceeds a predetermined value, the switch is switched from an off state to an on state, and couples the second power accumulation device to the first power accumulation device, when the winding-up amount of the mainspring falls below the predetermined value, the switch is switched from the on state to the off state, and decouples the second power accumulation device from the first power accumulation device, and in a case in which the voltage detection circuit detects that the voltage of the second power accumulation device is equal to or lower than another predetermined value, even when the winding-up amount of the mainspring exceeds the predetermined value, the off state of the switch is maintained.

9. An electrically controlled mechanical watch comprising:

a mainspring;

a wheel train configured to transmit mechanical energy of the mainspring;

a hand driven by the wheel train to display the time;

a speed regulator configured to control a rotation cycle of the wheel train;

a control circuit configured to control the speed regulator;

a power generator configured to convert the mechanical energy of the mainspring to electrical energy;

a first power accumulation device configured to accumulate the electrical energy of the power generator and supply the electrical energy to the control circuit;

a second power accumulation device coupled to the first power accumulation device in parallel via a switch and configured to accumulate the electrical energy;

a detection circuit configured to detect a mechanical energy amount accumulated in the mainspring;

a voltage detection circuit configured to detect a voltage of the second power accumulation device, wherein in a case in which the switch is in an off state, when the detection circuit detects that the mechanical energy amount exceeds a first set value, the control circuit controls the switch from the off state to an on state, in a case in which the switch is in the on state, when the detection circuit detects that the mechanical energy amount falls below a second set value, the control circuit controls the switch from the on state to the off state, and in a case in which the voltage detection circuit detects that the voltage of the second power accumulation device is equal to or lower than a predetermined value, even when it is detected that the mechanical energy amount exceeds the first set value, the control circuit maintains the switch in the off state.

* * * * *